(12) United States Patent
Wang et al.

(10) Patent No.: US 9,197,905 B2
(45) Date of Patent: Nov. 24, 2015

(54) SYSTEM AND METHOD FOR TRANSFERRING NON-VIDEO DATA OVER A VIDEO INTERFACE

(71) Applicant: TEXAS INSTRUMENTS INCORPORATED, Dallas, TX (US)

(72) Inventors: Jian Wang, Sugar Land, TX (US); Thanh Thien Tran, Houston, TX (US); Gang Hua, Houston, TX (US); Ivan Garcia, Richmond, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 531 days.

(21) Appl. No.: 13/632,636

(22) Filed: Oct. 1, 2012

(65) Prior Publication Data
US 2014/0092989 A1 Apr. 3, 2014

(51) Int. Cl.
*H04N 19/40* (2014.01)
*H04N 19/88* (2014.01)
*H04N 19/46* (2014.01)
*H04N 19/186* (2014.01)

(52) U.S. Cl.
CPC .............. *H04N 19/88* (2014.11); *H04N 19/186* (2014.11); *H04N 19/40* (2014.11); *H04N 19/46* (2014.11)

(58) Field of Classification Search
CPC ....... H04N 19/46; H04N 19/88; H04N 19/40; H04N 19/186
USPC .................................................. 375/219–223
See application file for complete search history.

(56) References Cited

U.S. PATENT DOCUMENTS

| 6,751,214 | B1 * | 6/2004 | Parruck et al. ................. 370/352 |
| 7,221,761 | B1 * | 5/2007 | Deshpande et al. .......... 380/216 |
| 2009/0116554 | A1 * | 5/2009 | Ma et al. ................... 375/240.16 |

OTHER PUBLICATIONS

Guo, Wang Xing, Liu Ji Lin, and Ishfaq Ahmad. "MPEG-2 Profile transcoding in MC-DCT domain." ICME. 2001.*
Zeng, Wenjun, Jiangtao Wen, and Mike Severa. "Fast self-synchronous content scrambling by spatially shuffling codewords of compressed bitstreams." Image Processing. 2002. Proceedings. 2002 International Conference on. vol. 3. IEEE, 2002.*
Telektronikk 2.94 Broadcasting [ISSN 0085-7130].*
Guo, Wang Xing, Liu Ji Lin, and Ishfaq Ahmad. "MPEG-2 Profile transcoding in MC-DCT domain." null. IEEE, 2001.*

* cited by examiner

*Primary Examiner* — Sath V Perungavoor
*Assistant Examiner* — Clifford Hilaire
(74) *Attorney, Agent, or Firm* — Robert D. Marshall, Jr.; Frank D. Cimino

(57) ABSTRACT

A video system includes a first video device. The first video device includes a video output port and an arbitrary data scrambler. The first video device transmits a video stream through the video output port. The video output port is configured to insert video timing reference values into the video stream. The arbitrary data scrambler is configured to scramble non-video data for transmission in the video stream such that unscrambled non-video data containing video timing reference values is transformed, without information loss, to scrambled non-video data containing no video timing reference values.

30 Claims, 4 Drawing Sheets

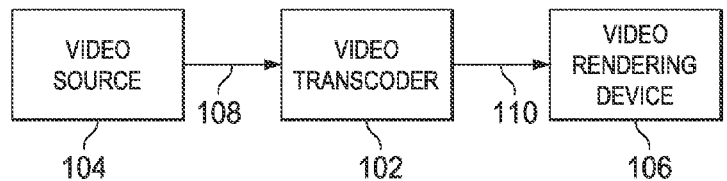
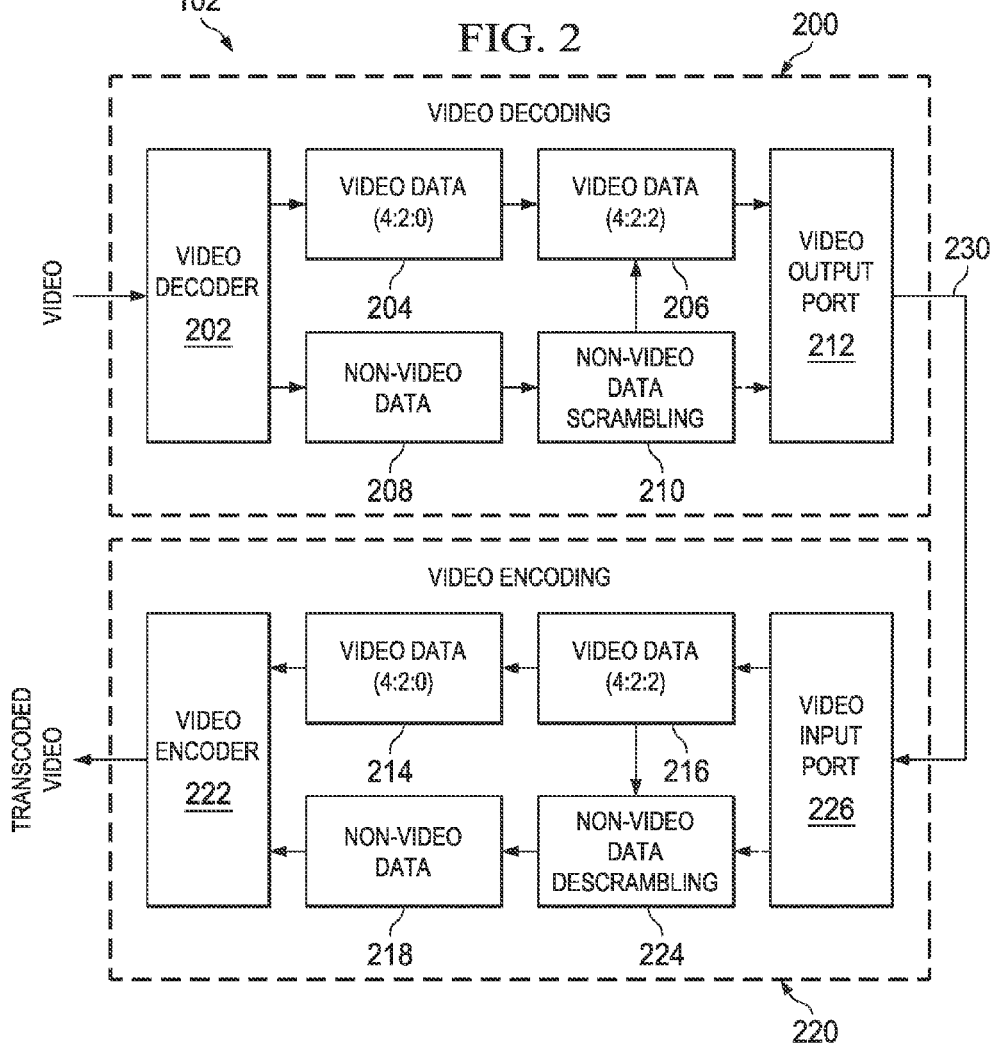

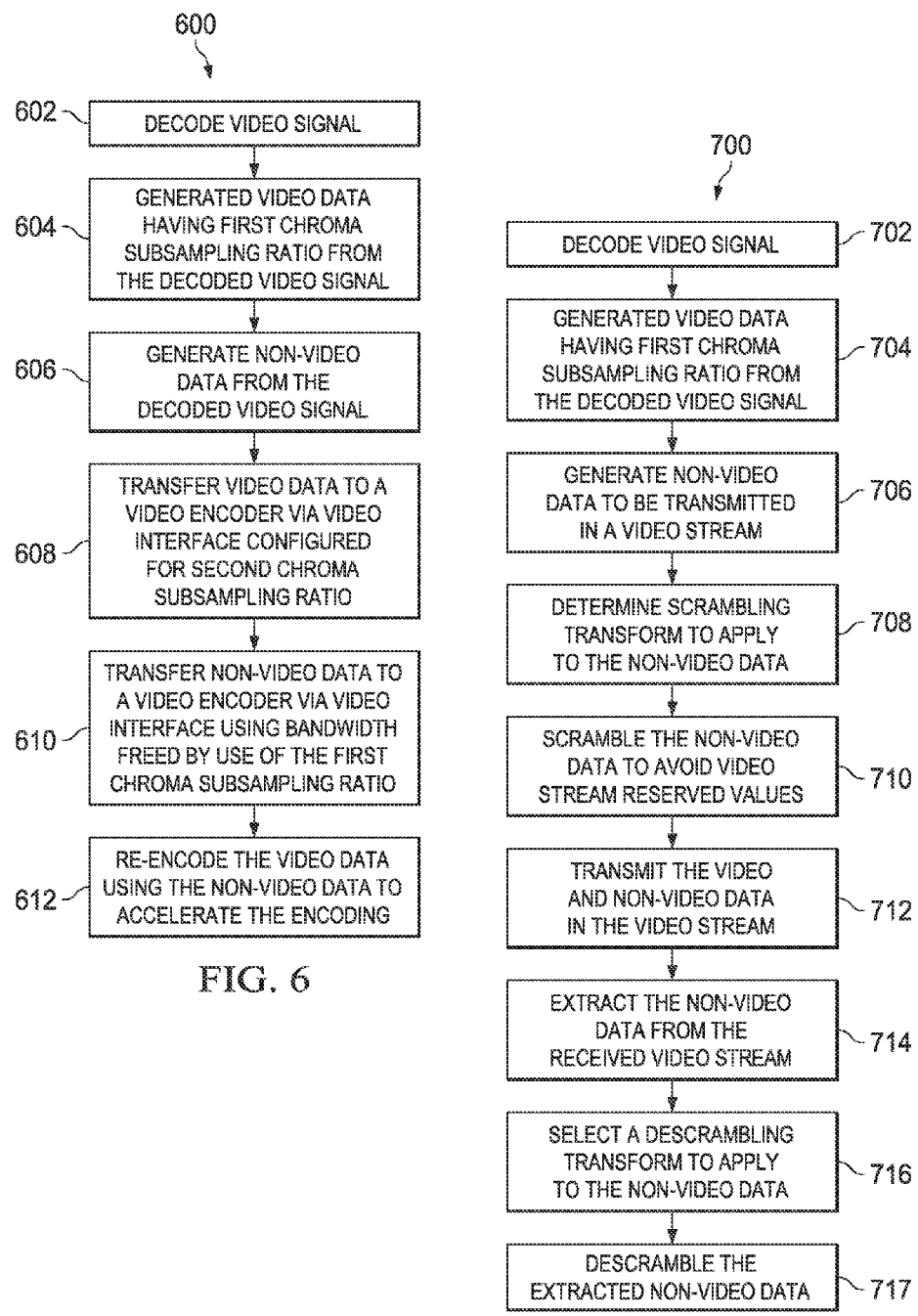

SYSTEM AND METHOD FOR TRANSFERRING NON-VIDEO DATA OVER A VIDEO INTERFACE

BACKGROUND

As the number and type of devices capable of rendering video increases, broadcast and internet protocol video transmission systems must be adapted to provide video content to the devices. Video rendering devices may range from large screen home entertainment systems to handheld portable devices, while video transmission systems encompass terrestrial broadcast, cable, wireline, and various wireless systems. To accommodate the breadth of video rendering devices, the video transmission systems transcode video content to various resolutions, frame rates, and/or bitrates in accordance with carrier bandwidth and video coding standards supported by the rendering devices. Examples of available video coding standards include MPEG-1, MPEG-2, and MPEG-4 part 2 standardized by the International Organization for Standardization ("ISO"), H.261 and H.263 standardized by the International Telecommunications Union ("ITU"), and H.264, also known as Advanced Video Coding ("AVC") or MPEG-4 part 10 standardized jointly by both ISO and ITU. The substantial number of video standards, and the widely varying capabilities of video rendering devices, make techniques for efficiently transcoding and transferring video and related information desirable.

SUMMARY

A system and method for transferring non-video data over a video interface are disclosed herein. In one embodiment, a video system includes a first video device. The first video device includes a video output port and an arbitrary data scrambler. The first video device transmits a video stream through the video output port. The video output port is configured to insert video timing reference values into the video stream. The arbitrary data scrambler is configured to scramble non-video data for transmission in the video stream such that, without information loss, unscrambled non-video data containing video timing reference values is transformed to scrambled non-video data containing no video timing reference values.

In another embodiment, a method for transferring video data includes generating frames of video data for transmission in a video stream. Non-video data for transmission in the video stream is also generated. Video timing reference values are inserted into the video stream. The non-video data is scrambled such that unscrambled non-video data containing video timing reference values is transformed to scrambled non-video data containing no video timing reference values without information loss. The scrambled non-video data is inserted into the video stream, and the video stream is transmitted.

In a further embodiment, a video transcoder includes a video decoder and a video encoder. The video decoder is configured to decode a received video signal to generate video data, and to transmit the video data via a video stream containing reserved values indicative of structures of the video data. The video decoder is also configured to transmit non-video data in the video stream, and to scramble the non-video data prior to transmission. The scrambling removes reserved values from the non-video data while completely preserving information content. The video encoder is configured to receive the video stream and encode the video data. The video encoder is further configured to extract the scrambled non-video data from the video stream; and to descramble the non-video data thereby regenerating the non-video data.

BRIEF DESCRIPTION OF THE DRAWINGS

For a detailed description of exemplary embodiments of the invention, reference will now be made to the accompanying drawings in which:

FIG. 1 shows a block diagram for a system for providing video in accordance with various embodiments;

FIG. 2 shows a block diagram for a video transcoder in accordance with various embodiments;

FIG. 6 shows a flow diagram for a method for transcoding video in accordance with various embodiments; and FIG. 7 shows a flow diagram for a method for transferring arbitrary data over a video interface in accordance with various embodiments.

NOTATION AND NOMENCLATURE

Figure 3:
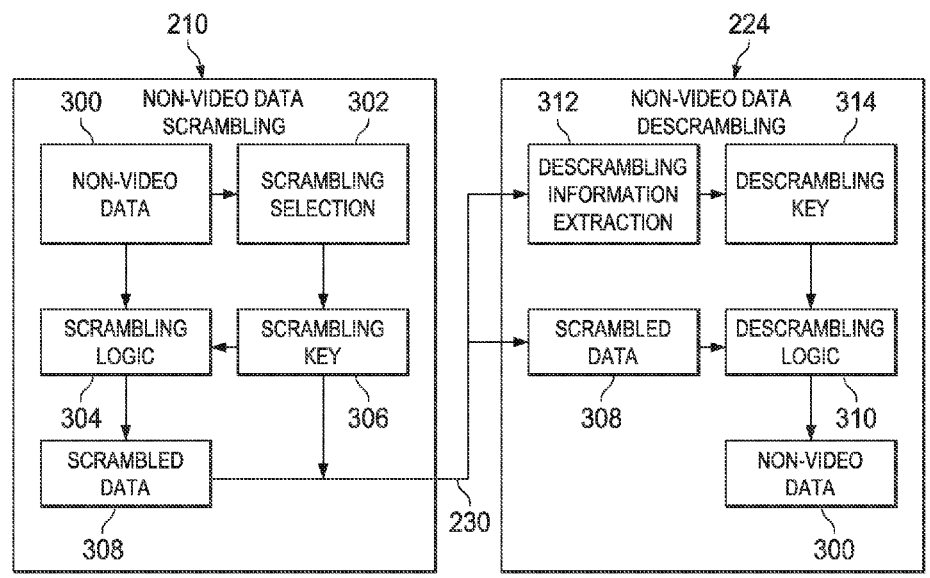
FIG. 3 shows a block diagram of non-video data scrambling logic and non-video data descrambling logic in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The terms "transcode," "transcoding" and the like as applied herein refer to changing applied coding standard, bit-rate (transrating), or picture size (transsizing) of video.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional video transcoders are typically based on personal computer platforms that read a video file from secondary storage and write a transcoded version of the video file to a different portion of secondary storage. Consequently, conventional transcoding platforms may require large secondary storage and may provide a limited number of coding formats.

In contrast to conventional systems, embodiments of the present disclosure are not limited to any number of video coding formats or standards. From a single stored master copy of a video, embodiments can transcode the video in real-time in accordance with a format required by a device on which the video is to be rendered. To provide efficient video transcoding, embodiments transfer video having a selected chroma subsampling ratio from a video decoder to a video encoder via a video interface configured to transfer a higher chroma subsampling ratio. Video statistics and coding parameters generated by the decoder may be transferred to the encoder using bandwidth of the video interface freed by use of the selected chroma subsampling rate. The encoder applies the statistics and parameters to improve quality of encoded video.

Embodiments may transfer arbitrary data from the decoder to the encoder using the freed video interface bandwidth. An arbitrary data scrambler at the video data transmission port of the video interface scrambles the arbitrary data to avoid values reserved for use in a video stream transferred via the interface. An arbitrary data descrambler associated with the video data reception port of the video interface descrambles the arbitrary data for use in the encoder. The encoder may apply the non-video data to accelerate or improve the quality of encoded video.

FIG. 1 shows a block diagram for a system 100 for providing video in accordance with various embodiments. The system 100 includes a video source 104, a video transcoder 102, and video rendering device 106. The video source 104 may be a storage device suitable for storing video, such as magnetic or optical disks, semiconductor memory, etc. Alternatively, the video source 104 may be receiving device that detects video transmitted over a medium (e.g., a wired or wireless medium) and extracts the transmitted video therefrom. The video 108 provided by the video source is encoded in accordance with particular video standard (e.g., MPEG2) and contains video frames of a specific resolution, frame rate, etc.

The video transcoder 102 re-encodes the video 108 such that the video 110 includes the content of the video 108, but is encoded in accordance with a video standard (e.g., H.264), resolution, frame rate, etc. suitable for rendering by the video rendering device 106. The video rendering device 106 may be any device capable of displaying video from a digital video stream (e.g., a flat-screen television, a tablet computer, a smart phone, a gaming system, etc.).

Embodiments of the video transcoder 102 may be configured to process the video data 108 in real-time, and to transfer statistics and other non-video data generated as the data is decoded to an encoder via a video interface in conjunction with transfer of decoded video data to the encoder. Embodiments provide bandwidth on the video interface for non-video data transfer by generating and transferring to the encoder video data with a chroma subsampling ratio lower than that for which the video interface is configured. The encoder may apply the non-video data to accelerate, and/or improve the quality of, video encoding.

FIG. 2 shows a block diagram for a video transcoder 102 in accordance with various embodiments. The video transcoder 102 includes a video decoding subsystem 200 and a video encoding subsystem 220. In some embodiments, the video decoding subsystem 200 is implemented as a first device (e.g., a first integrated circuit) and the video encoding subsystem 220 is implemented as a second device (e.g., a second integrated circuit). Output of the video decoding subsystem 200 is coupled to the input of the video encoding subsystem 220 via a video interface 230. The video decoding subsystem 200 provides decoded video data to the video encoding subsystem 220 via the video interface 230. The video interface 230 may be a standard video interface, such as an ITU-R BT.1120 interface (ITU-R BT.1120-7) or an ITU-R BT.656 interface (ITU-R BT.656-5) as specified by the International Telecommunication Union. Accordingly, the video interface 230 may be configured to transport video data having a predetermined chroma subsampling ratio, e.g., 4:2:2 as per ITU-R BT.1120 and ITU-R BT.656.

The video decoding subsystem 200 includes a video decoder 202 that processes received video signal. The video decoder 202 may convert the received video signal to luma and chroma values for each pixel of a video frame. The video decoder 202 outputs decoded video data at a predetermined chroma subsampling rate. For example, the video decoder 202 may output the decoded video data 204 at a 4:2:0 chroma subsampling rate. The video data 204 having 4:2:0 chroma subsampling rate is inserted into a video stream specified by the parameters of the video interface 230. Thus, the video data 204 may be inserted in to a video stream 206 configured to transport video data having a 4:2:2 chroma subsampling ratio. Insertion into the video stream 206 may be accomplished by storing the video data 204 in a memory buffer dimensioned to hold video data in accordance with specifications of the video interface 230. Thus, embodiments of the video decoding subsystem 200 provide decoded video having a lower chroma subsampling ratio than that specified by the video interface 230.

The video decoder 202 also provides as output, non-video data 208. The non-video data 208 may include various statistics and information about the video derived as the video decoder 202 processes the received video signal. For example, the video decoder 202 may track or monitor the location of a macroblock within successive frames of a video data. Identifying frame to frame location changes of a macroblock, the video decoder 202 can generate a motion vector specifying frame-to-frame motion of the macroblock. Similarly, the video decoder 202 may identify areas of a video frame that include a relatively higher degree of detail than other portions of the frame. The video decoder 202 may provide information identifying such areas. Such non-video information may be applied to advantage by the video encoding system 220 to reduce encoding time and/or improve encoding quality.

The non-video data 208 generated by the video decoder 202 is provided to a non-video data scrambling module 210. The video interface 230 may require that certain data values be reserved for use as indicators in the video stream. For example, video timing reference values, such frame and/or line delimiting codes may be reserved. The non-video data scrambling module 210 scrambles the non-video data 208 such that scrambled non-video data contains all the information of the non-video data 208 and does not contain values reserved for use by the video interface 230.

The non-video data scrambling module 210 may scramble the non-video data 208 by applying a scrambling transform to the non-video data 208. A scrambling transform refers to a processing procedure that converts the non-video data 208 to scrambled non-video data. Embodiments of the non-video data scrambling module 210 may be configured to apply a plurality of different scrambling transforms. The scrambling transform applied to the non-video data may be selected based on the content of the non-video data 208. In some embodiments of the transcoder 102, if the non-video data 208 is limited to a predetermined range of values. For example, if the non-video data 208 is limited to motion vectors, the range of non-video data values 208 will be limited to those vector values needed to describe frame-to-frame motion of a macroblock (e.g., a narrow range of values about zero). Given a limited range of predetermined non-video values to be scrambled, a scrambling transform may be selected and applied to eliminate reserved values from the non-video data. For example, the non-video data scrambling module 210 may shift all or portion of the non-video values to a predetermined equivalent range that avoids the reserved values (e.g., values ranging from −1023 to +1023 may be shifted to 0 to 2047).

In some embodiments of the transcoder 102, the non-video data 208 is not limited to a predetermined range of values. Instead, the range of non-video data values 208 may be arbitrary. In such embodiments, the non-video data scrambling module 210 may select and apply suitable scrambling transforms. Some embodiments apply a 254 byte to 256 byte scrambling transform that transfers 254 bytes of the non-video data in a 256 byte block. The non-video data scrambling module 210 examines the selected 254 bytes of non-video data 208, identifies instances of a reserved value in the 254 bytes and identifies values not present in the 254 bytes (i.e., missing values, at least two of 256 possible byte values will be missing from the 254 bytes). The non-video data scrambling module 210 assigns a value missing from the 254 bytes to each reserved value and replaces each instance of the reserved value with the assigned missing value. The 255th and 256th bytes of the block may contain information indicating which values in the 254 bytes correspond to reserved values. Embodiments may apply similar scrambling to a different number of bytes, e.g., 253/256, 100/128, etc., depending of the number of reserved values to be replaced. The 255th and 256th bytes of the block which contain the information indicating which values in the 254 bytes correspond to reserved values may be located at any predetermined position within the block (e.g., start of block, end of block, etc.).

More generally, the non-video data scrambling module 210 may select and apply a suitable scrambling transform and scrambling key based on the examination of the non-video data 208. Application of the selected scrambling transform and scrambling key to the non-video data 208 produces encoded non-video data that includes no values reserved by the video interface 230. The scrambling key is a value applied in conjunction with or as part of the scrambling transform to scramble the non-video data 208 (e.g., information relating missing to reserved values as described above). Because the ranges of portions of the non-video data 208 may be arbitrary, a first scrambling key may be selected for scrambling of non-video data 208 falling within a first range of values, and a second scrambling key may be selected for scrambling of non-video data 208 falling within a second range of values. Information identifying the scrambling transform and/or the scrambling key applied to scramble the non-video data 208 may be included in the video stream for delivery to the video encoding subsystem 220 and used in descrambling.

Some embodiments of the non-video data scrambling module 210 apply a scrambling key to the non-video data 208 via bit-wise exclusive disjunction. Other embodiments may apply a scrambling key to the non-video data 208 in a different way. Some embodiments may employ a look-up table to perform the scrambling, where the look-up table provides a scrambled value output for each value of non-video data 208.

The video data generated by the video decoder 202, which has a chroma subsampling ratio lower than that for which the video interface 230 is specified, and the scrambled non-video data are provided to the video output port 212. In some embodiments, the scrambled non-video data may be stored, along with the lower chroma subsampling ratio (e.g., 4:2:0) video data to be transmitted, in a buffer sized for video data having a chroma subsampling ratio specified by the video interface 230 (e.g., a frame buffer sized for a 4:2:2 chroma subsampling ratio). The video output port 212 prepares the data (video and non-video) for transmission in accordance with the requirements of the video interface 230. For example, the video output port 212 may insert reserved values, such as video timing reference codes, etc. into the data. The video output port 212 drives the data to the video encoding subsystem 220 via the video interface 230.

Thus, embodiments of the video transcoder 102 are configured to transfer video data and non-video data useable by the encoder 202 to improve the efficiency of encoding and/or quality the quality of transcoded video via a video interface. No non-video buses or interfaces are required to transfer the non-video data. All data related to the transcoding may be transferred over the video interface which reduces transcoder cost and complexity.

The video encoding subsystem 220 includes a video encoder 222, a non-video data descrambling module 224, and a video input port 226. The video input port 226 receives the video stream transmitted over the video interface 230 from the video output port 212 of the video decoding subsystem 200. The video input port 226 may reverse the operations performed by the video output port 212. For example, the video input port 226 may remove reserved values inserted into the video stream by the video output port 212, and provide the remaining video and non-video data for encoding. In some embodiments, the video input port 226 may load the received video and non-video data into buffers 216 (e.g., frame buffers) sized to accommodate the chroma subsampling ratio (e.g., 4:2:2) specified by the video interface 230.

In the video encoding subsystem 220, the non-video data received in the video stream is provided to the non-video data descrambling module 224. The non-video data descrambling module 224 applies a descrambling transform to the scrambled non-video data to generate the non-video data 218 (which is the same as the non-video data 208 scrambled in the video decoding subsystem 200). A descrambling transform refers to a processing procedure that converts the scrambled non-video data to non-video data 218. The non-video data descrambling module 224 may select the descrambling transform and/or descrambling key based on information transferred via the video interface 230 in conjunction with the scrambled non-video data. The non-video data descrambling module 224 applies the selected descrambling transform and/or descrambling key to reverse the scrambling operations performed in the video decoding system 200. Thus, if values of the non-video data have been shifted or replaced with missing values as described above, the non-video data descrambling module 224 can apply an inverse shift or identify and replace the modified values of the non-video data.

In some embodiments, the descrambling key may be the same as the scrambling key applied in the non-video data scrambling module 210 to scramble the received non-video data. In some embodiments, the descrambling key and/or descrambling transform may be known a prior to the non-video data descrambling module 224 (e.g., when the non-video data falls within a known limited range of values). In some embodiments, the descrambling key may be transferred to the video encoding subsystem 220 in the video stream and extracted therefrom by non-video data decoding module 224. Alternatively, the non-video data descrambling module 224 may apply a table to decode the non-video data. Some embodiments of the non-video data descrambling module 224 may apply the descrambling key to the scrambled non-video data via exclusive disjunction or other operation.

In some embodiments of the video transcoder 102, the video decoding system 200 does not scramble the non-video data 208. In such embodiments, the video encoding system 220 identifies reserved values in the video stream received via the video interface 230, and determines which of the identified reserved values correspond to non-video data 208 and/or which of the reserved values have been provided by the video output port 212. For example, the video encoding system 220 may determine that reserved values inserted in the video stream by the video output port 212 are present in the received video data only at particular positions and/or reception times, and correspondingly, reserved values not at the particular positions and/or reception times are values of the non-video data 208.

The video data 214 is provided to the video encoder 222. The video data 214 has a lower chroma subsampling ratio (e.g., 4:2:0) than is specified by the video interface 230 (e.g., 4:2:2). The non-video data descrambling module 224 may provide descrambled non-video data 218 to the video encoder 222. The video encoder 222 encodes the video data 214 in accordance with a selected video standard, resolution, rate, etc. useable by a selected video rendering device 106. The video encoder 222 may apply the non-video data transferred via the video interface 230 to accelerate and/or improve the quality of encoded video. For example, if the non-video data 218 identifies an area of a frame requiring higher resolution than other areas of the frame, then the encoder 222 may devote more bits to the identified area than to other areas of the frame, thereby improving video quality. Similarly, if the non-video data 218 includes a motion vector associated with a macroblock, then the encoder 222 may locate the macroblock based on the motion vector rather than expending processing resources to locate the macroblock in a wider area of the frame, thereby accelerating encoding and/or expending fewer processing resources than would be required without the non-video data.

FIG. 3 shows a block diagram for the non-video data scrambling module 210 and the non-video data descrambling module 224 in accordance with various embodiments. In the non-video data scrambling module 210, unscrambled non-video data 300 (which may be the same as non-video data 208) is provided to scrambling selection logic 302 and scrambling logic 304. The scrambling selection logic 302 may examine the unscrambled data 300 and determine a scrambling transform and/or scrambling key 306 based on the examination. For example, the scrambling selection logic 302 may select a scrambling transform to apply to the data and select a first scrambling key 306 based on unscrambled data 300 being within a first range of values and select a second scrambling key 306 based on unscrambled data 300 being within a second range of values. In some embodiments, the scrambling transform and/or the scrambling key 306 may be predetermined. The scrambling logic 304 applies the scrambling transform and/or the scrambling key 306 to scramble the unscrambled data 300, thereby eliminating values reserved for use by the video interface 230 from the scrambled data 308, while retaining all information provided by the unscrambled data 300.

Embodiments of the scrambling logic 304 may combine the unscrambled data 300 and the scrambling key 306 in various ways. For example, reserved values may be replaced by different values, a scrambling key 306 may be applied to non-video data by exclusive disjunction, etc. In some embodiments, information indicative of the applied scrambling transform and/or scrambling key 306 is inserted in the video stream for transfer to the non-video data descrambling module 224 via the video interface 230. Some embodiments of the scrambling logic 304, a scrambling transform may apply a scrambling table to lookup scrambled non-video data values based on the unscrambled data 300.

The non-video data descrambling module 224 receives the scrambled data 308 in a video stream via the video interface 230. The scrambled data 308 is provided to descrambling logic 310. The descrambling information extraction logic 312 determines a descrambling transform and/or a descrambling key 314 to apply to the scrambled data 308. Application of the descrambling transform and/or descrambling key 314 regenerates the unscrambled data 300 in the non-video data decoding module 224. The descrambling information extraction logic 312 may extract information indicative of the descrambling transform and/or the descrambling key 314 directly from the video stream, and selects a descrambling transform and/or the descrambling key 314 based on the information. For example, the video stream may include information indicate that a range of data has been shifted in value by a defined amount, thereby indicating that a shift of inverse amount be applied to descramble the data.

In some embodiments, video encoding system 220 may predetermine the descrambling transform and/or the descrambling key 314 to be applied. In some embodiments, the descrambling key 314 may be the same as the scrambling key 306. The descrambling logic 310 applies the descrambling transform and/or the descrambling key 314 to descramble the scrambled data 308, thereby regenerating the unscrambled data 300 in the non-video data descrambling module 224. Embodiments of the descrambling logic 310 may combine the scrambled data 308 and the descrambling key 314 in various ways (by exclusive disjunction for example) to perform the descrambling. The descrambling logic 310 may retrieve the values of the unscrambled data 300 from a lookup table based on the values of the scrambled data 308 in some embodiments of a descrambling transform.

Figure 4:
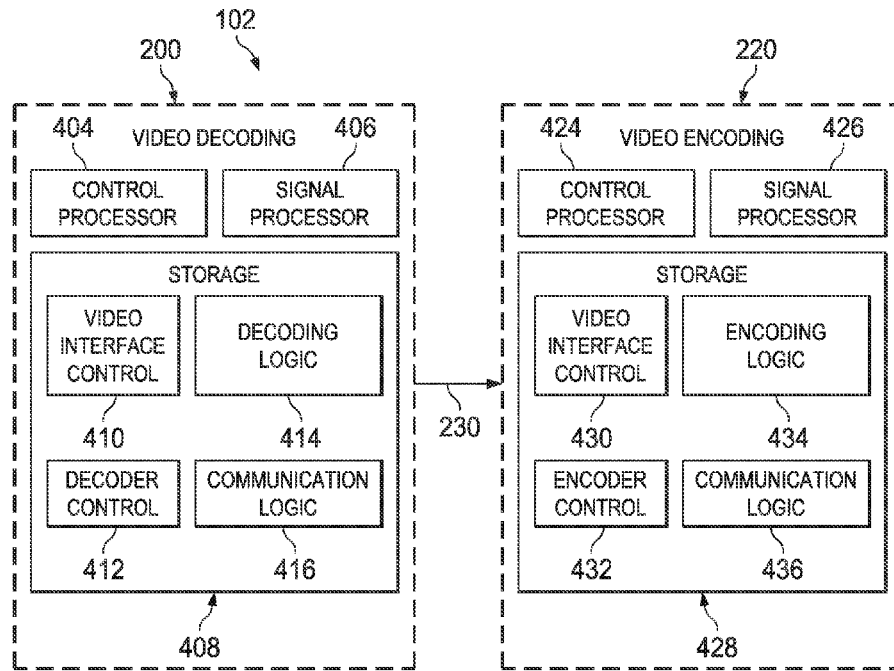
FIG. 4 shows a block diagram for a processor-based system for video transcoding in accordance with various embodiments.

FIG. 4 shows a block diagram for a processor-based video transcoder 102 in accordance with various embodiments. The processor based video transcoder 102 includes the video decoding subsystem 200 and the video encoding subsystem 220. The video decoding subsystem 200 includes a control processor 404, a signal processor 406, and storage 408. Similarly, the video encoding subsystem 220 includes a control processor 424, a signal processor 426, and storage 428. In some embodiments, a single processor may provide the functionality of the control processor 404 and the signal processor 406, and/or the control processor 424 and the signal processor 426.

The control processor(s) 404, 424 and/or the signal processor 406, 426 may be, for example, general-purpose microprocessors, digital signal processors, microcontrollers, or other suitable devices configured to execute instructions for performing operations disclosed herein. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 408 stores software programming (i.e., processor executable instructions) that causes the processors 404, 406 to perform the video decoding subsystem operations disclosed herein. Similarly, the storage 428 stores software programming (i.e., processor executable instructions) that causes the processors 424, 426 to perform the video encoding subsystem operations disclosed herein. In various embodiments, the storage 408, 428 may comprise individual per processor storage. In other embodiments, storage may be shared by multiple processors.

The storage 408, 428 is a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure, any reference to a function performed by software instructions, or to software instructions performing a function is simply a shorthand means for stating that the function is performed by a processor executing the instructions.

The storage 408 includes decoding logic 414, decoder control logic 412, video interface control logic 410, and communication logic 416. The decoding logic 414 includes instructions that, when executed, cause the signal processor 406 to decode a video signal provided to the signal processor 406 into video components (e.g., luma and chroma) at a chroma subsampling ratio lower than that specified by the video interface 230, and to derive information related to the video from the decoding (e.g., non-video information such as inter-frame macroblock motion information, etc.). Various embodiments of the decoding logic 414 may decode a video signal encoded in accordance with any given video standard. Consequently, the video decoding subsystem 200 is not limited to decoding any particular video standard.

The decoding logic 414 may also include instructions for scrambling non-video data for transmission via the video interface 230 as disclosed herein. The video interface control logic 410 manages the operations of the video output port 212, thereby controlling video decoding subsystem 200 access to the video interface 230. The decoder control logic 412 includes instructions that cause the control processor 404 to manage the decoding operations performed by the signal processor 406 in accordance with received video signal. For example, the decoder control logic 412 may trigger decoding based on reception of a frame of encoded video signal. The communication logic 416 manages various communication ports and protocols associated with communication ports other than the video interface 230, over which video signals or other communications may be transferred (e.g., IEEE 802.3, IEEE 802.11, UDP, etc.).

The storage 428 includes encoding logic 434, encoder control logic 432, video interface control logic 430, and communication logic 436. The encoding logic 434 includes instructions that, when executed, cause the signal processor 426 to encode decoded video data provided to the signal processor 406 via the video interface 230 according to a video standard, resolution, frame rate, etc. associated with a given video rendering device 106. Various embodiments of the encoding logic 434 may encode received video data in accordance with any given video standard. Consequently, the video encoding subsystem 220 is not limited to encoding based on any particular video standard.

The encoding logic 434 may apply non-video information transferred over the video interface 230 in conjunction with the decoded video data to improve encoding. The encoding logic 434 may include instructions for descrambling non-video data received via the video interface 230 as disclosed herein. The video interface control logic 430 manages the operations of the video input port 226, thereby controlling access to the video interface 230 by the video encoding subsystem 220. The encoder control logic 432 includes instructions that cause the control processor 424 to manage the encoding operations performed by the signal processor 426 in accordance with decoded video data received via the video interface 230. For example, the encoder control logic 432 may trigger encoding based on reception of a frame of decoded video data. The communication logic 436 manages various communication ports and protocols associated with communication ports other than the video interface 230, over which transcoded video signals or other communications may be transferred (e.g., IEEE 802.3, IEEE 802.11, UDP, etc.).

Figure 5:
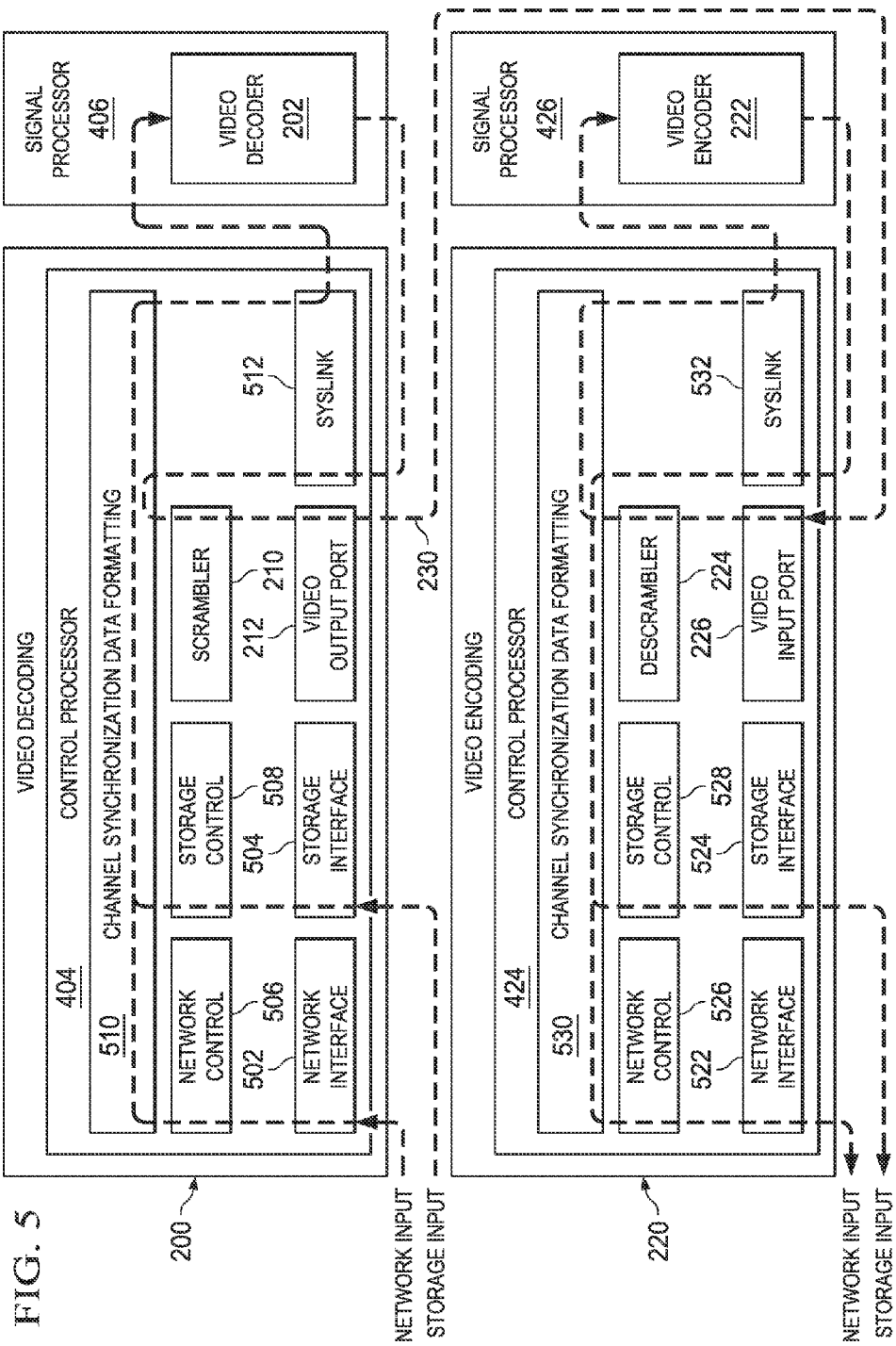
FIG. 5 shows a block diagram and data flow for an embodiment of a processor based system in accordance with various embodiments.

FIG. 5 shows a block diagram and data flow for an embodiment of a processor based system in accordance with various embodiments. In the video decoding subsystem 200, the control processor 404 receives encoded video via the network interface 502 or the storage interface 504. The network interface 502 connects and/or interfaces the decoding subsystem 200 to a wired or wireless network (e.g., a network compliant with IEEE 802.3, 802.11, etc.). The storage interface 504 connects and/or interfaces the decoding subsystem 200 to a storage device via, for example, Universal Serial Bus, Serial Advanced Technology Attachment, etc. The network interface 502 and storage interface 504 are respectively controlled by a network control module 506 and a storage control module 508. Video data received via the network interface 502 is processed by the network control module 506 in accordance with protocols applied to the video data for transfer over the network. Similarly, video data received via the storage interface 504 is processed by the storage control module 508 in accordance with protocols applied to the video data for transfer from a storage device.

The channel synchronization and data formatting module 510 manages and controls the operations of the various modules and interfaces of the control processor 404. More specifically, the channel synchronization and data formatting module 510 provides control and synchronization for received video streams, for example, if multiple video streams are being received and processed. The channel synchronization and data formatting module 510 formats the received video data for decoding. For example, the channel synchronization and data formatting module 510 may extract audio data from the video stream so that the video data alone may be provided to the signal processor 406 for decoding.

Video data is transferred to the signal processor 406 for decoding via the Syslink inter-processor interface 512. In the signal processor 406, the video decoding logic 414 decodes the video data into luma and chroma components at a chroma subsampling ratio lower than that specified by the video interface 230, and generates non-video data associated with the decoded video data. The signal processor 406 transfers the decoded video data and associated non-video data back to the control processor 404 via the Syslink inter-processor interface 512.

The channel synchronization and data formatting module 510 transfers the non-video data to the scrambler 210. The scrambler 210 scrambles the non-video data to remove values reserved for use by the video interface 230 as disclosed herein. In some embodiments, the scrambler 210 may be executed in the signal processor 406. The decoded video data and the scrambled non-video data are transferred to the video output port 212 and transmitted to the video encoding system 220 via the video interface 230. The video output port 212 may insert reserved values into the aggregate video and non-video data to, for example, identify structures such as frames.

The decoded video and scrambled non-video data transferred via the video interface 230 is received by the control processor 424 of the video encoding subsystem 220 via the video input port 226. The descrambler 224 regenerates the non-video data by descrambling the received scrambled non-video as disclosed herein. The channel synchronization and data formatting module 530 transfers the decoded video data and the descrambled non-video data to the signal processor 426 via the Syslink inter-processor interface 532. In the signal processor 426, the video encoder 222 re-encodes the decoded video data in accordance with a video standard, resolution, frame rate, etc. associated with a given video rendering device 106. The video encoder 222 may apply the descrambled non-video data transferred over the video interface 230 in conjunction with the decoded video data to accelerate or improve encoding. The transcoded video data generated by re-encoding the decoded video data is passed back to the control processor 424 via the Syslink inter-processor interface 532.

The channel synchronization and data formatting module 530 transfers the transcoded video to storage via the storage control module 528 and the storage interface 524 and/or to a display device (e.g., the video rendering device 106) via the network control module 526 and the network interface 522. The network interface 522 connects and/or interfaces the encoding subsystem 220 to a wired or wireless network (e.g., a network compliant with IEEE 802.3, 802.11, etc.). The storage interface 524 connects and/or interfaces the encoding subsystem 220 to a storage device via, for example, Universal Serial Bus, Serial Advanced Technology Attachment, etc. Video data to be transferred via the network interface 522 is processed by the network control module 506 in accordance with protocols applied to the video data for transfer over the network. Similarly, video data received to be transferred via the storage interface 504 is processed by the storage control module 508 in accordance with protocols applied to the video data for transfer to a storage device.

FIG. 6 shows a flow diagram for a method 600 for transcoding video in accordance with various embodiments. Though depicted sequentially as a matter of convenience, at least some of the actions shown can be performed in a different order and/or performed in parallel. Additionally, some embodiments may perform only some of the actions shown. At least some of the operations of the method 600 can be performed by a processor (e.g., processors 404, 406, 424, 426) executing instructions read from a computer-readable medium (e.g., storage 408, 428).

In block 602, the transcoder 102 receives an encoded video signal and decodes the video signal. From the decoded video signal, the transcoder 102 generates decoded video data having a first chroma subsampling ratio in block 604. For example, the transcoder 102 may generate decoded video data having a 4:2:0 chroma subsampling ratio.

In block 606, the transcoder 102 generates non-video data from the decoded video signal. The non-video data may be associated with the decoded video data in that the non-video data provides information about the decoded video data and/or the pre-decode video signal. For example, the non-video data may describe inter-frame macroblock motion, relative levels of detail of sub-regions of a video frame, or provide other information about the video that is useful for transcoding.

In block 608, the decoded video data is transferred to a video encoding subsystem 220 of the transcoder 102 via the video interface 230. The video interface may be a standard video interface, such as a video interface in accordance with ITU-R BT.1120 or ITU-R BT.656. The video interface 230 specifies transfer of, and is configured to transfer, video data having a second chroma subsampling ratio (e.g., 4:2:2) that is higher than the first chroma subsampling ratio of the decoded video data generated by the transcoder 102.

In block 610, the non-video data is transferred to the video encoding subsystem 220 of the transcoder 102 via the video interface 230. The non-video data is transferred over the video interface 230 using bandwidth of the video interface 230 made available by use of the first chroma subsampling ratio with the decoded video data.

In block 612, the transcoder 102 re-encodes the decoded video data in accordance with a video standard, resolution, rate, etc. suitable for use with the video rendering device 106. The transcoder 102 applies the non-video data during the encoding to accelerate encoding and/or improve the quality of the transcoded video.

FIG. 7 shows a flow diagram for a method 700 for transferring arbitrary data over a video interface in accordance with various embodiments. Though depicted sequentially as a matter of convenience, at least some of the actions shown can be performed in a different order and/or performed in parallel. Additionally, some embodiments may perform only some of the actions shown. At least some of the operations of the method 700 can be performed by a processor (e.g., processors 404, 406, 424, 426) executing instructions read from a computer-readable medium (e.g., storage 408, 428).

In block 702, the video decoder 202 receives an encoded video signal and initiates decoding of the video signal. From the decoded video signal, the transcoder 102 generates decoded video data having a first chroma subsampling ratio in block 704. For example, the transcoder 102 may generate decoded video data having a 4:2:0 chroma subsampling ratio.

In block 706, the video decoder 202 generates non-video data that may be associated with the decoded video data and/or the encoded video signal. The non-video data may be associated with the decoded video data in that the non-video data provides information about the decoded video data and/or the encoded video signal. For example, the non-video data may describe inter-frame macroblock motion, relative levels of detail of sub-regions of a video frame, or provide other information useful for transcoding.

The non-video data is to be transferred along with the decoded video data over a video interface 230. The video interface 230 specifies and is configured to transfer video data having a second chroma subsampling ratio (e.g., 4:2:2) that is higher than the first chroma subsampling ratio of the decoded video data generated by the video decoder 202. The video interface 302 reserves some values for use as delimiters or other video identifiers. Transmission of such reserved values in the non-video data may disrupt operation of the video interface at the video input port 226 receiving the non-video data. In order to preclude such disruption, embodiments scramble the non-video data.

In block 708, the transcoder 102 examines the non-video data and determines how the non-video data should be scrambled for transmission with the video data. Based on the content of the non-video data, the transcoder 102 selects a scrambling transform to apply to the non-video data. The scrambling transform is selected such that when applied to the non-video data, the resultant scrambled non-video data includes no values reserved for use by the video interface 230. In some embodiments, the scrambling transform is predetermined, for example, when the range of non-video data values is known beforehand. In some embodiments, the scrambling transform is selected based on the non-video data values and/or the range thereof. In some embodiments, the scrambling transform may apply a table of values where a value in the table is associated with each non-video data value, and table output precludes values reserved for use by the video interface 230.

In block 710, the non-video data is scrambled to avoid the values reserved for use by the video interface 230. The scrambling may include applying the scrambling transform to the non-video data values. The applying may include bit-wise exclusive disjunction of a transform key and the non-video data values in some embodiments. In other embodiments, a table lookup may be employed to perform the encoding.

In block 712, the decoded video data and the scrambled non-video data are transmitted in a video stream via the video interface 230. In some embodiments, information indicative of the scrambling transform applied a scrambling key applied, etc. to scramble the non-video data is transmitted in the video stream.

In block 714, the video encoding subsystem 220 of the transcoder 102 receives the video stream and extracts the non-video data from the video stream. In some embodiments, the video encoding subsystem 220 extracts the scrambling transform information, scrambling key information, etc. indicative of the procedure applied to scramble the non-video data from the video stream.

In block 716, the video encoding subsystem 220 selects a descrambling transform to apply to the scrambled non-video data extracted from the video stream. In some embodiments the descrambling transform may be the same as the scrambling transform used to scramble the non-video data. In some embodiments, selection of a descrambling transform may include identification of a descrambling key which may be: a scrambling key extracted from the video stream, a predetermined descrambling key known a priori to the video encoding system 220, a descrambling key determined by examination of the encoded non-video data, or a descrambling table including an entry corresponding to each encoded non-video data value, etc.

In block 717, the video encoding subsystem 220 applies the selected descrambling transform to the non-video data. Application of the descrambling transform to the scrambled non-video data reverses the scrambling performed by the video decoding system 200, thereby regenerating the non-video data values provided by the video decoder 202. The regenerated non-video data values may be applied to improve and/or accelerate transcoding.

The scrambling and descrambling of non-video data values described in method 700 may be applied in conjunction with the transfer of non-video data for use in accelerating and/or improving the quality of transcoding described in the method 600. While transfer of non-video data has been described with regard to video related information, embodiments may encode and transfer any arbitrary non-video data over the video interface 230 using video interface bandwidth freed by transfer of video data having a lower chroma subsampling ratio lower than that specified by a video interface over which the video and non-video data are transferred.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A video system, comprising:
 a first video device comprising:
  a video output port through which the first video device transmits a video stream, the video output port configured to output at least one reserved data value and to transmit video data having a first chroma subsampling ratio; and
  an arbitrary data scrambler configured to scramble non-video data for transmission in the video stream such that unscrambled non-video data containing said at least one reserved data value is transformed to scrambled non-video data containing no reserved data values by substitution of an unused non-video data value for each instance of said reserved data value; and
 wherein the first video device is configured to:
  provide video data to the video output port having a second chroma subsampling rate that is lower than the first chroma subsampling rate; and
  transmit the scrambled non-video data using bandwidth of the video stream made available by use of the second chroma subsampling rate.

2. The video system of claim 1, wherein the arbitrary data scrambler is configured to:
 examine the unscrambled non-video data:
 select a scrambling transform, based on the non-video data; and
 apply the scrambling transform to scramble the non-video data for transmission in the video stream.

3. The video system of claim 2, wherein the arbitrary data scrambler is configured to:
 select a scrambling key based on the non-video data; and
 apply the scrambling key to the unscrambled non-video data, to generate the scrambled non-video data.

4. The video system of claim 1, wherein the non-video data comprises values restricted to a given range; and the arbitrary data scrambler is configured to apply a predetermined scrambling transform selected based on the given range of values to scramble the non-video data for transmission in the video stream.

5. The video system of claim 1, further comprising:
 a second video device comprising:
  a video input port through which the second video device receives the video stream, the video input port configured to detect video timing reference values in the video stream; and
  an arbitrary data descrambler configured to:
   extract the scrambled non-video data from the video stream; and
   reverse the scrambling performed by the arbitrary data scrambler to regenerate the unscrambled non-video data.

6. The video system of claim 5, wherein the arbitrary data descrambler is configured to:
 extract information indicative of a scrambling transform from the video stream;
 select a descrambling transform based on the information; and
 apply the descrambling transform to the scrambled non-video data to reverse the scrambling performed by the arbitrary data scrambler.

7. The video system of claim 5, wherein the arbitrary data descrambler is configured to:
 extract information indicative of a scrambling key from the video stream;
 select a descrambling key based on the information; and
 apply the descrambling key to the scrambled non-video data to reverse the scrambling performed by the arbitrary data scrambler.

8. The video system of claim 1, wherein the video output port corresponds to a video interface based on one of ITU-R BT.1120 and ITU-R BT.656.

9. A method for transferring video data, comprising:
generating frames of video data for transmission in a video stream;
generating non-video data for transmission in the video stream, said non-video data including at least one reserved data value;
providing the video data for transmission, the video data having a first chroma subsampling rate, wherein the video stream is arranged to transport video data having a second chroma subsampling rate that is higher than the first chroma subsampling rate;
scrambling the non-video data such that the non-video data containing said at least one reserved data value is transformed to scrambled non-video data containing no reserved data values by substitution of an unused non-video data value for each instance of said reserved data value;
inserting the scrambled non-video data into portions of the video stream made available in accordance with a difference in the first and second chroma subsampling rates;
transmitting the video stream.

10. The method of claim 9, further comprising:
examining the non-video data:
selecting a scrambling transform, based on the non-video data; and
applying the scrambling transform to the non-video data to generate the scrambled non-video data for transmission in the video stream.

11. The method of claim 10, further comprising:
selecting a scrambling key, based on the non-video data; and
applying the scrambling key to the non-video data to generate the scrambled non-video data for transmission in the video stream.

12. The method of claim 9, further comprising:
predetermining a scrambling transform prior to the generating of the non-video data based on the non-video data being restricted to a predetermined range of values;
applying the predetermined scrambling transform to scramble the video data for transmission in the video stream.

13. The method of claim 9, further comprising inserting information indicative of the scrambling transform applied to scramble the non-video data into the video stream.

14. The method of claim 9, further comprising:
receiving the transmitted video stream;
detecting video timing references values in the received video stream;
extracting the scrambled non-video data from the video stream;
descrambling the scrambled non-video data thereby reversing the scrambling to regenerate the non-video data.

15. The method of claim 14, further comprising:
extracting information indicative of a scrambling transform from the video stream;
selecting a descrambling transform based on the information; and
applying the scrambling transform to the scrambled non-video data to reverse the scrambling of the non-video data.

16. The method of claim 15, further comprising:
extracting information indicative of a scrambling key from the video stream;
selecting a descrambling key based on the information; and
applying the scrambling key to the scrambled non-video data to reverse the scrambling of the non-video data.

17. A video transcoder, comprising:
a video decoder configured to:
decode a received video signal to generate video data;
transmit the video data via a video stream comprising reserved values indicative of structures of the video data;
transmit non-video data in the video stream;
scramble the non-video data prior to transmission, wherein the scrambling removes reserved values from the scrambled non-video data while completely preserving information content;
a video encoder configured to:
receive the video stream and encode the video data,
extract the scrambled non-video data from the video stream; and
descramble the scrambled non-video data thereby regenerating the non-video data.

18. The video transcoder of claim 17, wherein the video decoder is configured to:
analyze the non-video data;
determine a scrambling transform to apply based on a result of the analysis;
scramble the non-video data using the scrambling transform.

19. The video transcoder of claim 17, wherein the video decoder is configured to insert information indicative of a scrambling transform used to scramble the non-video data into the video stream; and the video encoder is configured to:
extract the information from the video stream;
select a descrambling transform based on the information; and
apply the descrambling transform to descramble the non-video data.

20. The video transcoder of claim 17, wherein:
the video decoder is configured to:
determine a scrambling key to apply to the non-video data based on a scrambling transform; and
scramble the non-video data by applying the scrambling key to the non-video data; and
the video encoder is configured to:
determine a descrambling key to apply to the scrambled non-video data based on a descrambling transform; and
descramble the non-video data by applying the scrambling key to the scrambled non-video data.

21. The video transcoder of claim 17, wherein the video decoder is configured to:
generate the video data at a first chroma subsampling rate that is lower than the chroma subsampling rate that a video interface coupling the video decoder to the video encoder is configured to transport; and
transmit the scrambled non-video data using bandwidth of the video interface freed by transmission of the video data at the first chroma subsampling rate.

22. The video transcoder of claim 21, wherein the video interface is based on one of ITU-R BT.1120 and ITU-R BT.656.

23. The video system of claim 1, wherein:
said at least one reserved data value includes a video timing reference value.

24. The video system of claim 23, wherein:
said video timing reference value includes a line delimiting code.

25. The video system of claim 23, wherein:
said video timing reference value includes a frame delimiting code.

26. A video system, comprising:
a first video device comprising:
   a video output port through which the first video device transmits a video stream, the video output port configured to output at least one reserved data value; and
   an arbitrary data scrambler configured to scramble non-video data for transmission in the video stream such that unscrambled non-video data containing said at least one reserved data value is transformed to scrambled non-video data containing no reserved data values by substitution of an unused non-video data value for each instance of said reserved data value by examining a block of non-video data to
      identify instances of said at least one reserved data value within said block,
      identify instances of a data value not used within said block,
      substituting an identified data value not used within said block for each instance of said at least one reserved data value,
      generating at least one data value identifying each instance of said at least one reserved data value replaced by said identified data value not used within said block, and
      transmitting an expanded block of non-video data including said block of video data with said identified data value not used within said block substituted for each instance of said at least one reserved data value and said data value identifying each instance of said at least one reserved data value replaced by said identified data value not used within said block.

27. The method of claim 9, wherein:
said at least one reserved data value includes a video timing reference value.

28. The method of claim 27, wherein:
said video timing reference value includes a line delimiting code.

29. The method of claim 27, wherein:
said video timing reference value includes a frame delimiting code.

30. A method of for transferring video data, comprising:
generating frames of video data for transmission in a video stream;
generating non-video data for transmission in the video stream, said non-video data including at least one reserved data value;
scrambling the non-video data such that the non-video data containing said at least one reserved data value is transformed to scrambled non-video data containing no reserved data values by substitution of an unused non-video data value for each instance of said reserved data value including
   examining a block of non-video data to
      identify instances of said at least one reserved data value within said block,
      identify instances of a data value not used within said block,
   substituting an identified data value not used within said block for each instance of said at least one reserved data value,
   generating at least one data value identifying each instance of said at least one reserved data value replaced by said identified data value not used within said block, and
   transmitting an expanded block of non-video data including said block of video data with said identified data value not used within said block substituted for each instance of said at least one reserved data value and said data value identifying each instance of said at least one reserved data value replaced by said identified data value not used within said block;
inserting the scrambled non-video data into the video stream;
transmitting the video stream.

* * * * *